July 2, 1940.   R. E. MATHES   2,206,416

DIFFERENTIAL ELECTRICAL METER

Filed Nov. 11, 1937

INVENTOR.
RICHARD E. MATHES

BY   *H. S. Brown*

ATTORNEY.

Patented July 2, 1940

2,206,416

UNITED STATES PATENT OFFICE 2,206,416

DIFFERENTIAL ELECTRICAL METER

Richard E. Mathes, Westfield, N. J., assignor to Radio Corporation of America, a corporation of Delaware Application November 11, 1937, Serial No. 173,995

5 Claims. (Cl. 171—95)

This invention relates to a new type of differential electrical meter which is particularly adapted to read the percent or relative difference between currents flowing in two branches of an electrical circuit.

An object of this invention is to simplify and improve differential meters generally and increase the reliability of reading.

A feature of this invention is an arrangement whereby the meter gives accurate reading over long communication or similar systems of two different frequencies received over the same or different circuits.

This invention will best be understood by referring to the accompanying drawing, in which:

Fig. 1 diagrammatically shows a meter which is provided with a special winding in which the direct current of two coils is combined and caused to buck the normal flux of the field;

Fig. 2 diagrammatically shows a modified scheme of Fig. 1, in which a magnetic shunt by-passes a portion of the field flux;

Figure 1:
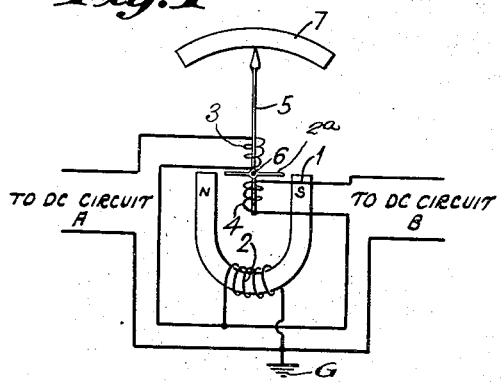

Referring now in detail to Fig. 1 of the drawing, there is a field member 1, which may comprise a magnetizable core the magnetic flux in which may be rendered permanent, or it may be temporarily controlled by current in a field coil, or both. A rotor 2a is constituted by an armature having two special coil windings 3 and 4 in which the direct current produces opposingly polarized lines of magnetic force. The resultant coacting with the normal flux of the field member 1 is caused to produce motion of the pointer 5. The currents flowing in both coils 3 and 4 are combined and caused to flow in special field coil 2, so arranged that the flux produced by coil 2 will buck the normal flux of the field member 1. The effect of this circuit arrangement is such as to neutralize the field intensity in proportion to the total intensity of the two currents received by two independent direct current circuits A and B in which one side of each circuit is connected in common by ground G so that the pointer 5 will retain its position for a given relative difference between the currents of the two circuits A and B, even though the amplitudes of the currents or voltages in the circuits vary considerably. The meter is provided with the usual armature bearing 6 and scale 7, the graduations of which may be for any desired quantities, such as current, voltage or watts.

Figure 2:
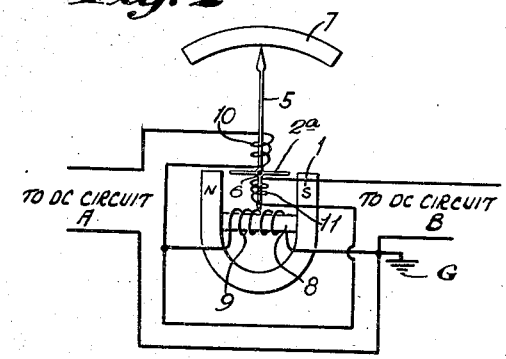

Fig. 2 is different from Fig. 1 in that a magnetic shunt 8 by-passes a portion of the field flux. A special winding 9 is placed upon the magnetic shunt and is arranged so as to vary the amount of flux by-passed in accordance with the absolute magnitudes of the currents in both circuits A and B flowing through the coils 10 and 11, respectively.

Figure 3:
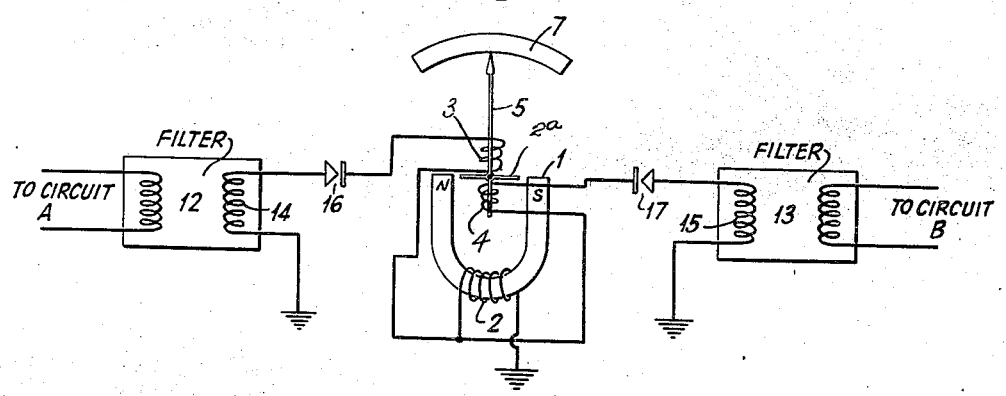
Fig. 3 shows a circuit for using the meter of this invention.

Fig. 3 shows a novel circuit arrangement for using the meter of this invention to register a difference between two alternating or tone currents, the circuit of which comprises a filter 12 which is connected to circuit A and a filter 13 which is connected to circuit B. Filters 12 and 13 are preferably of the bandpass type and may be of any suitable network and comprise such elements as an electrical or electro-mechanical crystal, reed, tuning fork, or similar schemes. These filters are connected either to separate lines or the same lines and are connected through their output windings 14 and 15 to rectifiers 16 and 17, the form of which may be such as to produce the direct current necessary for operating the windings 2, 3 and 4 of the type of meter shown by Fig. 1.

Figure 4:
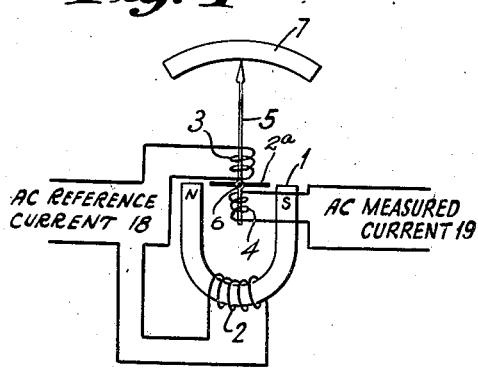
Fig. 4 shows another circuit arrangement for using the meter of this invention.

Fig. 4 shows a circuit arrangement by means of which the meter of this invention may be connected to a reference current circuit 18 and a measured current circuit 19, for example, if it is desired, one frequency may be used as a reference and the other may be measured relative to it, as, for instance, by using a single frequency pilot tone, which may be used primarily to actuate automatic level adjusting equipment on a tone line, or for other similar purposes.

Figure 5:
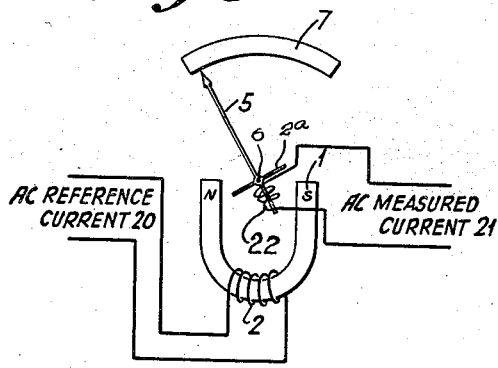
Fig. 5 also shows another circuit arrangement for using the meter of this invention.

Fig. 5 shows a circuit in which the meter of this invention may be used to measure a carrier tone in which the reference circuit 20 connects directly to field coil 2 and the measured circuit 21 connects to armature coil 22.

The meter of this invention can be used for many other purposes than described above, such as for example (1) for line testing, in which the meter provides a quick method of measuring the deviation of a line of equipment frequency characteristic from a reference point (such as 1,000 cycles) without the need of measuring the total or absolute gain or loss in decibels; (2) for average radio range, in that it measures relative distances and provides a direct indication of the distance a plane is off a course regardless of the distance of the plane from the transmitting beacon; (3) for telemetering, in telemetering work, for example, for reading electrical or other indicated quantities at a distance. This will be invaluable as it is necessary that the true reading of the distant quantity be obtained, regardless of the diurnal weather or other variations in the transmitter or in the attenuation characteristics of the interconnecting lines or other systems. This also applies to use in remote control work of automatic power substations, remote control of radio equipment, and similar uses. Therefore, this invention should not be limited except as to such limitations as are clearly imposed in the appended claims.

What is claimed is:

1. An electrical instrument for indicating the ratio between currents flowing in two branches of a circuit, said instrument comprising means for producing a magnetic field of a given normal flux, a pivotally mounted element having two coils secured thereto, said coils comprising conductors which cut lines of force of said magnetic field when said element is rotated, each of said coils being included in a respective one of the two said circuit branches, means including a third coil for varying the flux in said magnetic field, and means interconnecting at least two of said three coils whereby the ratio between the amplitudes of the currents flowing in said two branches is caused to be indicated.

2. An instrument according to claim 1 in which the magnetic field producing means comprises a main core member surrounded by said third coil.

3. An instrument according to claim 1 in which the magnetic field producing means comprises a main core member and a shunt core member, the latter being surrounded by said third coil.

4. In a device of the class described, an instrument according to claim 1 in combination with two filters, each of said filters being disposed in a respective one of the two branches of said circuit.

5. An electrical instrument for measuring the ratio between the amplitudes of two currents, comprising a stator field member having a magnetizable core, an armature pivotally mounted within the field of influence of said stator member, a pointer and two coils suitably mounted on said armature, each of said coils being conductive of a respective one of said currents, and means including a third coil surrounding a portion of said magnetizable core and connected between ground and a point of interconnection of the two armature coils for varying the flux across said field of influence of the stator member in dependence upon the difference between said two currents.

RICHARD E. MATHES.